United States Patent
Okuno

(10) Patent No.: US 11,072,682 B2
(45) Date of Patent: Jul. 27, 2021

(54) LIQUID CYCLOPENTENE RING-OPENED POLYMER, RUBBER COMPOSITION, AND RUBBER CROSSLINKED PRODUCT

(71) Applicant: ZEON CORPORATION, Tokyo (JP)

(72) Inventor: Shingo Okuno, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/649,721

(22) PCT Filed: Sep. 10, 2018

(86) PCT No.: PCT/JP2018/033410
§ 371 (c)(1),
(2) Date: Mar. 23, 2020

(87) PCT Pub. No.: WO2019/065177
PCT Pub. Date: Apr. 4, 2019

(65) Prior Publication Data
US 2020/0255588 A1    Aug. 13, 2020

(30) Foreign Application Priority Data

Sep. 29, 2017 (JP) .............................. JP2017-190601

(51) Int. Cl.
*C08G 61/08* (2006.01)
*C08K 3/013* (2018.01)
*C08L 9/00* (2006.01)
*C08K 5/00* (2006.01)
*C08K 3/04* (2006.01)
*C08K 3/36* (2006.01)

(52) U.S. Cl.
CPC .............. *C08G 61/08* (2013.01); *C08K 3/013* (2018.01); *C08K 5/0025* (2013.01); *C08L 9/00* (2013.01); *C08K 3/04* (2013.01); *C08K 3/36* (2013.01)

(58) Field of Classification Search
CPC ....................................................... C08G 61/08
See application file for complete search history.

(56) References Cited

U.S. PATENT DOCUMENTS

| 3,634,376 A * | 1/1972 | Nutzel ................... C08G 61/08 526/124.1 |
| 6,060,570 A | 5/2000 | Nubel et al. |
| 6,143,851 A | 11/2000 | Nubel et al. |
| 8,889,806 B2 | 11/2014 | Tsunogae et al. |
| 2009/0187001 A1 | 7/2009 | Pawlow et al. |
| 2009/0306268 A1 | 12/2009 | Pawlow et al. |
| 2013/0172635 A1* | 7/2013 | Hannen ................... C07C 13/02 585/17 |
| 2016/0002382 A1* | 1/2016 | Tsunogae ............... C08G 61/08 524/547 |
| 2019/0040186 A1* | 2/2019 | Faler .................... C08G 61/025 |

FOREIGN PATENT DOCUMENTS

| CN | 103224578 A | 7/2013 |
| JP | H11-514043 A | 11/1999 |
| JP | 2009-528434 A | 8/2009 |
| JP | 2013-529695 A | 7/2013 |

OTHER PUBLICATIONS

Oct. 23, 2018 Search Report issued in International Patent Application No. PCT/JP2018/033410.
May 25, 2021 Extended European Search Report issued in European Patent Application No. 18863431.5.

* cited by examiner

*Primary Examiner* — Robert C Boyle
(74) *Attorney, Agent, or Firm* — Oliff PLC

(57) ABSTRACT

A liquid cyclopentene ring-opened polymer having a weight average molecular weight (Mw) of 1,000 to 50,000 and a cis double content of 55% or more in repeating units.

8 Claims, No Drawings

LIQUID CYCLOPENTENE RING-OPENED POLYMER, RUBBER COMPOSITION, AND RUBBER CROSSLINKED PRODUCT

TECHNICAL FIELD

The present invention pertains to a liquid cyclopentene ring-opened polymer, a rubber composition, and a cross-linked rubber.

BACKGROUND ART

Liquid diene elastomers, such as liquid polybutadiene and liquid polyisoprene, have excellent rubber elasticity derived from double bonds in their polymer main chains. Due to this nature, such elastomers are widely used as modifiers which are mixed with solid rubbers to improve the processability, the hardness, the mechanical strength, and the elongation of the rubbers.

The addition of such liquid diene elastomers to solid rubbers, however, may result in cross-linked rubbers having poor ozone resistance. This problem has created a demand for liquid elastomers which enable the formation of cross-linked rubbers having excellent ozone resistance.

It is also common knowledge that relatively low-molecular-weight cyclic olefin ring-opened polymers can be prepared by ring-opening metathesis polymerization of cyclic olefins in the presence of a relatively large amount of chain transfer agent. For example, in Patent Documents 1 and 2, relatively low-molecular-weight cyclic olefin ring-opened polymers are prepared by ring-opening polymerization of cyclic olefins such as 1,5-cyclooctadiene and cyclopentene using ruthenium carbene complex catalysts as ring-opening polymerization catalysts.

Unfortunately, because of the reaction mechanism, ring-opening polymerization using ruthenium carbene complex catalysts as in the techniques of Patent Documents 1 and 2 may result in cyclic olefin ring-opened polymers having a high trans double bond content in repeating units. Their high trans content promotes crystallization at low temperature, resulting in poor handling properties at low temperature. Another problem of the cyclic olefin ring-opened polymers specifically disclosed in Patent Document 2 is that because the polymers crystallize at low temperature, cross-linked rubbers prepared by mixing the polymers with solid rubbers and then cross-linking the resulting rubber compositions may have poor cold resistance (poor rubber elasticity at low temperature).

Patent Document 3 discloses a liquid cyclooctene ring-opened polymer having a relatively high cis content. Although the cis content is high, the cyclooctene ring-opened polymer tends to crystallize at low temperature due to its structure. Because of this feature, the cyclooctene ring-opened polymer also has the following problems: the polymer has poor handling properties at low temperature; and a cross-linked rubber prepared by mixing the polymer with a solid rubber and then cross-linking the resulting rubber composition may have poor cold resistance (poor rubber elasticity at low temperature).

RELATED ART DOCUMENTS

Patent Documents

Patent Document 1: Japanese Patent Publication No. JP H11-514043

Patent Document 2: Japanese Patent Publication No. JP 2009-528434

Patent Document 3: Japanese Patent Publication No. JP 2013-529695

SUMMARY OF THE INVENTION

Problem to be Solved by the Invention

In view of the above issues, the present invention is aimed at providing a liquid cyclopentene ring-opened polymer which has excellent handling properties at low temperature (e.g., about −30° C.), and provides a rubber composition and a cross-linked rubber which have excellent ozone resistance and cold resistance.

Means for Solving the Problem

As a result of intensive studies to achieve the above purpose, the present inventor has found that a liquid cyclopentene ring-opened polymer having the following characteristics can maintain the form of a liquid with low viscosity even at low temperature: the weight average molecular weight (Mw) is within a predetermined range; and the cis double bond content in repeated units is adjusted to a specific level or more. The present inventor has also found that a rubber composition prepared by mixing such a liquid cyclopentene ring-opened polymer with a solid rubber and a cross-linked rubber prepared by cross-linking the rubber composition have excellent ozone resistance and cold resistance. These findings have led to the completion of the present invention.

Additionally, the present inventor has made intensive studies on how to produce a liquid cyclopentene ring-opened polymer which has a weight average molecular weight within a predetermined range and a cis main-chain double bond content adjusted to a specific level or more, and has found that such a liquid cyclopentene ring-opened polymer can be produced by using specific polymerization catalysts and controlling the polymerization temperature within the range of 20 to 80° C. In particular, the present inventor has found that in order to produce a high cis-content liquid cyclopentene ring-opened polymer which is the liquid state at room temperature, the polymerization temperature is controlled to as high as 20° C. or higher, thereby providing a highly active liquid cyclopentene ring-opened polymer having a high cis content, whereas the temperature during polymerization should be controlled to as low as 0° C. or lower to increase the cis content of a high-molecular-weight cyclopentene ring-opened polymer which is in the solid state at room temperature.

Specifically, the present invention provides a liquid cyclopentene ring-opened polymer having a weight average molecular weight (Mw) of 1,000 to 50,000 and a cis double bond content of 55% or more in repeating units.

The liquid cyclopentene ring-opened polymer according to the present invention preferably contains structural units derived from cyclopentene in an amount of 80 mol % or more of the total repeating units, and more preferably is a polymer consisting of only structural units derived from cyclopentene.

The liquid cyclopentene ring-opened polymer according to the present invention preferably has a cis double bond content in the repeating units of more than 60%.

The liquid cyclopentene ring-opened polymer according to the present invention preferably has a melt viscosity measured at 25° C. of 3,000 Pa·s or less.

The present invention also provides a method for producing the liquid cyclopentene ring-opened polymer, comprising performing ring-opening polymerization of a monomer including cyclopentene at a polymerization temperature of 20° C. to 80° C. using a chain transfer agent and polymerization catalysts including a transition metal compound (A) of Group 6 in the periodic table and an organoaluminum compound (B) represented by general formula (1) below:

(in general formula (1), $R^1$ and $R^2$ each represent a $C_{1-20}$ hydrocarbon group, and X satisfies 0<X<3).

Additionally, the present invention provides a rubber composition containing the liquid cyclopentene ring-opened polymer in an amount of 1 to 100 parts by weight with respect to 100 parts by weight of a solid rubber.

The rubber composition according to the present invention preferably further contains an inorganic filler.

The rubber composition according to the present invention preferably further contains a cross-linker.

The present invention further provides a cross-linked rubber obtained by cross-linking the rubber composition.

Effects of Invention

The present invention can provide a liquid cyclopentene ring-opened polymer which has excellent handling properties at low temperature (e.g., about −30° C.), and provides a rubber composition and a cross-linked rubber which have excellent cold resistance and ozone resistance.

DESCRIPTION OF EMBODIMENTS

The liquid cyclopentene ring-opened polymer according to the present invention is a polymer which contains repeating units derived from ring-opening polymerization of cyclopentene as repeating units constituting the main chain, and has a weight average molecular weight (Mw) of 1,000 to 50,000 and a cis main-chain double bond content of 55% or more.

From the viewpoint of cold resistance and ozone resistance, the liquid cyclopentene ring-opened polymer according to the present invention contains structural units derived from ring-opening polymerization of cyclopentene in an amount of preferably 80 mol % or more, more preferably 90 mol % or more, further more preferably 95 mol % or more of the total repeating units. Particularly preferably, the liquid cyclopentene ring-opened polymer according to the present invention is a polymer substantially consisting of only structural units derived from ring-opening polymerization of cyclopentene or, in other words, a polymer substantially consisting of only structural units derived from cyclopentene. However, the liquid cyclopentene ring-opened polymer according to the present invention may contain repeating units derived from other monomers copolymerizable with cyclopentene as long as the properties of the liquid cyclopentene ring-opened polymer are maintained. The amount of the repeating units derived from other monomers is preferably 20 mol % or less, more preferably 10 mol % or less, further more preferably 5 mol % or less of the total repeating units. Examples of the other monomers copolymerizable with cyclopentene include monocyclic olefins other than cyclopentene, monocyclic dienes, monocyclic trienes, polycyclic cycloolefins, polycyclic cyclodienes, polycyclic cyclotrienes, and the like. Examples of the monocyclic olefins other than cyclopentene include cyclooctene. Examples of the monocyclic dienes include 1,5-cycloocta-diene. Examples of the monocyclic trienes include 1,5,9-cyclododecatriene. Examples of the polycyclic cycloolefins, polycyclic cyclodienes, and polycyclic cyclotrienes include norbornene compounds such as 2-norbornene, dicyclopentadiene, 5-ethylidene-2-norbornene, 5-ethyl-2-norbornene, 5-phenyl-2-norbornene, and 1,4-methano-1,4,4a,9a-tetrahydro-9H-fluorene, and tetracyclo[6.2.1.1$^{3,6}$0.0$^{2,7}$]dodeca-4-ene. The cyclopentene and the other monomers copolymerizable with cyclopentene may or may not have a substituent. One of these other monomers copolymerizable with cyclopentene may be used alone, or two or more of them may be used in combination.

The liquid cyclopentene ring-opened polymer according to the present invention has a weight average molecular weight (Mw) of 1,000 to 50,000, which is measured by gel permeation chromatography, and is calibrated with polystyrene standards. The weight average molecular weight (Mw) is preferably 1,500 to 45,000, more preferably 2,000 to 40,000, further more preferably 2,000 to 20,000, particularly preferably 3,000 to 9,000. If the weight average molecular weight (Mw) is too low, a cross-linked rubber prepared by mixing the polymer with a solid rubber and then cross-linking the resulting rubber composition has poor mechanical strength such as tensile strength. On the other hand, if the weight average molecular weight (Mw) is too high, the liquid cyclopentene ring-opened polymer cannot maintain the liquid state, and therefore cannot provide the ozone resistance-improving effect.

The ratio (Mw/Mn) between the weight average molecular weight (Mw) and the number average molecular weight (Mn) of the liquid cyclopentene ring-opened polymer according to the present invention, which are measured by gel permeation chromatography and are calibrated with polystyrene standards, is typically 4.0 or less, preferably 3.5 or less, more preferably 3.0 or less, although not particularly limited thereto. When the Mw/Mn is adjusted within the above range, a cross-linked rubber prepared by mixing the polymer with a solid rubber and then cross-linking the resulting rubber composition has further enhanced mechanical strength.

The cis double bond content in the repeating units constituting the liquid cyclopentene ring-opened polymer according to the present invention is 55% or more, preferably 60% or more, more preferably more than 60%, further more preferably 63% or more, particularly preferably 65% or more. The upper limit of the cis content is preferably 99% or less, more preferably 90% or less, further more preferably less than 90%, although not particularly limited thereto. In the present invention, the liquid cyclopentene ring-opened polymer has a weight average molecular weight (Mw) of 1,000 to 50,000 and a cis double content in the repeating units of 55% or more. These features allow the liquid cyclopentene ring-opened polymer to maintain the form of a liquid with low viscosity even at low temperature (e.g., about −30° C.), and enable the polymer to be successfully mixed with a solid rubber. Additionally, when the polymer is mixed with the solid rubber, cross-linking of the resulting rubber composition provides a cross-linked rubber having further enhanced ozone resistance and cold resistance. A cis content of less than 55% tends to result in crystallization at low temperature, thereby leading to poor handling properties such as increased viscosity or transformation from the liquid state at low temperature. Additionally, a cis content of less than 55% leads to low compatibility with the solid rubber. In this case, a cross-linked rubber prepared by mixing the polymer with the solid rubber and then cross-linking the resulting rubber composition may have poor cold resistance and ozone resistance. The cis double bond content in the repeating units can be determined by measuring the cis/trans ratio of the liquid cyclopentene ring-opened polymer by $^{13}$C-NMR spectrometry.

The liquid cyclopentene ring-opened polymer according to the present invention is a liquid polymer or, in other words, a polymer in the liquid state at normal temperature (25° C.) (a polymer having fluidability at normal temperature (25° C.)). Specifically, the liquid cyclopentene ring-opened polymer according to the present invention is preferably a polymer having a level of fluidability at normal temperature (25° C.) which corresponds to a melt viscosity at 25° C. of about 3,000 Pa·s or less, which is measured using a Brookfield viscometer (B-type viscometer). The melt viscosity at 25° C. is more preferably 2,000 Pa·s or less, further more preferably 1,000 Pa·s or less, particularly preferably 10 Pa·s or less, most preferably 1 Pa·s or less. In particular, since the liquid cyclopentene ring-opened polymer according to the present invention has a high cis content (55% or more) as well as a weight average molecular weight (Mw) within the above ranges, an increase in melt viscosity caused by crystallization can be effectively prevented even at normal temperature (25° C.). For this reason, the liquid cyclopentene ring-opened polymer has low viscosity at normal temperature (25° C.) and excellent handling properties at normal temperature (25° C.).

The glass transition temperature (Tg) of the liquid cyclopentene ring-opened polymer according to the present invention is not particularly limited. From the viewpoint of ensuring further enhanced properties at low temperature, the glass transition temperature is preferably −90° C. or lower, more preferably −95° C. or lower, further more preferably −100° C. or lower. The glass transition temperature of the liquid cyclopentene ring-opened polymer can be controlled by adjusting the cis double bond content in the repeating units.

Although the liquid cyclopentene ring-opened polymer may have a molecular structure consisting of only carbon and hydrogen atoms, from the viewpoint of ensuring further enhanced ozone resistance, the molecular structure may contain an atom other than carbon and hydrogen atoms. Specifically, the molecular structure may contain a modification group containing an atom selected from the group consisting of atoms of the Group 15 elements in the periodic table, atoms of the Group 16 elements in the periodic table, and a silicon atom.

Preferred modification groups are modification groups containing an atom selected from the group consisting of a nitrogen atom, an oxygen atom, a phosphorus atom, a sulfur atom, and a silicon atom. Among these, modification groups containing an atom selected from the group consisting of a nitrogen atom, an oxygen atom, and a silicon atom are more preferable, and modification groups containing a silicon atom are further more preferable.

Examples of modification groups containing a nitrogen atom include amino, pyridyl, imino, amido, nitro, and urethane bond groups, and hydrocarbon groups containing these groups. Examples of modification groups containing an oxygen atom include hydroxyl, carboxylic acid, ether, ester, carbonyl, aldehyde, and epoxy groups, and hydrocarbon groups containing these groups. Examples of modification groups containing a silicon atom include alkylsilyl and oxysilyl groups, and hydrocarbon groups containing these groups. Examples of modification groups containing a phosphorus atom include phosphoric acid and phosphino groups, and hydrocarbon groups containing these groups. Examples of modification groups containing a sulfur atom include sulfonyl, thiol, and thioether groups, and hydrocarbon groups containing these groups. Alternatively, a modification group containing two or more of the above groups may be used. Among these, amino, pyridyl, imino, amido, hydroxyl, carboxylic acid, aldehyde, epoxy, and oxysilyl groups, and hydrocarbon groups containing these groups are preferable, and oxysilyl groups are particularly preferable. The "oxysilyl group" means a group containing a silicon-oxygen bond.

Specific examples of the oxysilyl groups include alkoxysilyl, aryloxysilyl, acyloxy, alkylsiloxysilyl, arylsiloxysilyl, and hydroxysilyl groups, and the like. Among these, aryloxysilyl groups are preferable because the introduction thereof provides a higher effect.

The "alkoxysilyl group" means a group containing at least one alkoxy group linked to a silicon atom. Specific examples thereof include trimethoxysilyl, (dimethoxy) (methyl)silyl, (dimethyl)silyl, triethoxysiliy, (diethoxy) (methyl)silyl, (ethoxy) (dimethyl)silyl, (dimethoxy) (ethoxy) silyl, (diethoxy) silyl, tripropoxysilyl, and tributoxysilyl groups, and the like.

In the case where the liquid cyclopentene ring-opened polymer has such a modification group, the position of the introduced modification group is not particularly limited. In order to further enhance the effect of introduction, the polymer preferably has a modification group-terminated polymer chain.

In the case where the liquid cyclopentene ring-opened polymer has a modification group-terminated polymer chain, the polymer chain may have the modification group introduced at only one end, or may have the modification groups introduced at both ends. Alternatively, these polymer chains may be present together. In addition to these polymer chains, an unmodified liquid cyclopentene ring-opened polymer in which the specific modification groups are not introduced to the ends of the polymer chain may also be present.

In one embodiment of the present invention, examples of methods for synthesizing the liquid cyclopentene ring-opened polymer include performing ring-opening polymerization of a monomer including cyclopentene at a polymerization temperature of 20° C. to 80° C. using a chain transfer agent and polymerization catalysts including a transition metal compound (A) of Group 6 in the periodic table and an organoaluminum compound (B) represented by general formula (1) below:

$$(R^1)_{3-x}Al(OR^2)_x \qquad (1)$$

(in general formula (1), $R^1$ and $R^2$ each represent a $C_{1-20}$ hydrocarbon group, and X satisfies 0<X<3); and the like.

The transition metal compound (A) of Group 6 in the periodic table is a compound having a transition metal of Group 6 in the periodic table (the long periodic table, the same applies to the following description), and is specifically a compound having a chromium atom, a molybdenum atom, or a tungsten atom. Preferred are compounds having a molybdenum atom or compounds having a tungsten atom, and particularly preferred are compounds having a tungsten atom because of their high solubility in cyclopentene. The transition metal compound (A) of Group 6 in the periodic table may be any compound having a transition metal of Group 6 in the periodic table. Examples thereof include halides, alcoholates, arylates, oxylates, and the like of any transition metal atom of Group 6 in the periodic table. Among these, halides are preferable because of their high polymerization activity.

Specific examples of such a transition metal compound (A) of Group 6 in the periodic table include molybdenum compounds such as molybdenum pentachloride, molybdenum oxotetrachloride, and molybdenum (phenylimide)tetrachloride; tungsten compounds such as tungsten hexachloride, tungsten oxotetrachloride, tungsten (phenylimide) tetrachloride, monocatecholate tungsten tetrachloride, bis(3, 5-di-tert-butyl)catecholate tungsten dichloride, bis(2-chloroetherate)tetrachloride, and tungsten oxotetraphenolate; and the like.

The amount of the transition metal compound (A) of Group 6 in the periodic table to be used is typically within the range of 1:100 to 1:200,000, preferably within the range of 1:200 to 1:150,000, more preferably within the range of 1:500 to 1:100,000 when expressed as a molar ratio "transition metal atom of Group 6 in polymerization catalyst: monomer including cyclopentene to be polymerized". The use of too small an amount of the transition metal compound (A) of Group 6 in the periodic table may not allow the polymerization reaction to sufficiently proceed. On the other hand, the use of an excess amount of the compound may lead to difficulties in removing residual catalyst from the liquid cyclopentene ring-opened polymer. In this case, a cross-linked rubber prepared by mixing the polymer with a solid rubber and then cross-linking the resulting rubber composition may have reduced properties.

The organoaluminum compound (B) is a compound represented by general formula (1) shown above. Specific examples of the $C_{1-20}$ hydrocarbon groups represented by $R^1$ and $R^2$ in general formula (1) include alkyl groups such as methyl, ethyl, isopropyl, n-propyl, isobutyl, n-butyl, t-butyl, n-hexyl, and cyclohexyl groups; aryl groups such as phenyl, 4-methylphenyl, 2,6-dimethylphenyl, 2,6-diisopropylphenyl, and naphthyl groups; and the like. Although the groups represented by $R^1$ and $R^2$ in the compound represented by general formula (1) may be the same or different, in order to appropriately adjust the cis content of the resulting cyclopentene ring-opened polymer within the preferable ranges described above, at least $R^2$ is preferably an alkyl group having 4 or more carbon atoms consecutively linked together, particularly more preferably a n-butyl, 2-methylpentyl, n-hexyl, cyclohexyl, n-octyl, or n-decyl group.

In general formula (1), x is $0<x<3$. Namely, in general formula (1), the values of $R^1$ and $OR^2$ in the compositional ratio can be any values within the ranges of $0<3-x<3$ and $0<x<3$, respectively. In order to increase the polymerization activity and appropriately adjust the cis content of the resulting cyclopentene ring-opened polymer within the preferable ranges described above, x is preferably $0.5<x<1.5$.

Although the amount of the organoaluminum compound (B) to be used varies depending on the type of the organoaluminum compound (B), the amount thereof is preferably 0.1 to 100 times by mole, more preferably 0.5 to 50 times by mole, further more preferably 0.5 to 20 times by mole the amount of the transitional metal of Group 6 in the periodic table in the transition metal compound (A) of Group 6 in the periodic table. The use of too small an amount of the organoaluminum compound (B) may result in insufficient polymerization activity, and an excess amount of the organoaluminum compound (B) tends to cause a side reaction during the ring-opening polymerization.

In order to control the weight average molecular weight (Mw) of the liquid cyclopentene ring-opened polymer within the above ranges, an olefin compound is preferably used as a chain transfer agent in the ring-opening polymerization. Examples of chain transfer agents include monoolefin compounds such as 1-butene, 1-pentene, 1-hexene, and 1-octene; diolefin compounds such as 1,4-pentadiene, 1,4-hexadiene, 1,5-hexadiene, 1,6-heptadiene, 2-methyl-1,4-pentadiene, and 2,5-dimethyl-1,5-hexadiene; and the like.

In the case where the liquid cyclopentene ring-opened polymer has a polymer chain terminated with the above modification group, a modification group-containing olefin compound which has the above modification group and one metathesis polymerizable olefinic carbon-carbon double bond is preferably used as a chain transfer agent.

One of these chain transfer agents may be used alone, or two or more of them may be used in combination.

The chain transfer agent may be used in any amount as long as the weight average molecular weight (Mw) of the liquid cyclopentene ring-opened polymer can be adjusted within the above ranges. The amount thereof is preferably 1 to 30 parts by weight, more preferably 2 to 25 parts by weight, further more preferably 3 to 20 parts by weight with respect to 100 parts by weight of the monomer including cyclopentene to be polymerized.

The ring-opening polymerization reaction may be performed in the presence or absence of a solvent. In order to appropriately increase the cis content of the resulting liquid cyclopentene ring-opened polymer, the reaction is preferably performed in the presence of a solvent. In particular, the ring-opening polymerization reaction is preferably performed in a reaction solution in which the concentration of the monomer including cyclopentene to be polymerized is adjusted to 50 wt % or more, more preferably 60 wt % or more, further more preferably 70 wt % or more. In the case where the ring-opening polymerization reaction is performed in the presence of a solvent, the solvent may be any solvent that is inert in the ring-opening polymerization reaction, and can dissolve substances to be used in the ring-opening polymerization, such as cyclopentene and the polymerization catalysts described above. Examples thereof include hydrocarbon-based solvents, halogen-based solvents, and the like. Specific examples of the hydrocarbon-based solvents include aromatic hydrocarbons such as benzene, toluene, xylene, and ethylbenzene; aliphatic hydrocarbons such as n-hexane, n-heptane, and n-octane; alicyclic hydrocarbons such as cyclohexane, cyclopentane, and methylcyclohexane; and the like. Specific examples of the halogen-based solvents include alkyl halogens such as dichloromethane and chloroform; aromatic halogens such as chlorobenzene and dichlorobenzene; and the like.

The polymerization temperature is preferably 20 to 80° C., more preferably 20 to 70° C., further more preferably 20 to 60° C. By controlling the polymerization temperature within the above ranges, the polymerization provides a liquid cyclopentene ring-opened polymer having an efficiently increased cis content. The polymerization reaction time is preferably 1 minute to 100 hours, more preferably 1 hour to 10 hours. Once the polymerization conversion ratio reaches a predetermined value, a known polymerization terminator may be added to the polymerization system to terminate the polymerization reaction.

Through the process described above, a polymer solution containing the liquid cyclopentene ring-opened polymer according to the present invention can be prepared. To the polymer solution containing the liquid cyclopentene ring-opened polymer thus prepared may be optionally added an antioxidant such as a phenol-based stabilizer, a phosphorus-based stabilizer, or a sulfur-based stabilizer. The amount of the antioxidant to be added can be determined according to factors such as the type thereof. Additionally, an extender oil may also be added if needed. As a method for recovering the liquid cyclopentene ring-opened polymer from the polymerization solution, a known recovery method can be used.

<Rubber Composition>

The rubber composition according to the present invention contains the liquid cyclopentene ring-opened polymer according to the present invention in an amount of 1 to 100 parts by weight with respect to 100 parts by weight of a solid rubber.

The solid rubber may be any rubbery polymer that is in the solid state at normal temperature (25° C.) (any polymer that does not have fluidability and has an ability to maintain its shape at normal temperature (25° C.)). The solid rubber typically has a Mooney viscosity ($ML_{1+1}$, 100° C.) of 20 or more when measured according to JIS K 6300.

The solid rubber is not particularly limited. Examples thereof include conjugated diene rubbers such as natural rubber (NR), polyisoprene rubber (IR), styrene-butadiene rubber (SBR), polybutadiene rubber (BR), styrene-isoprene copolymer rubber, butadiene-isoprene copolymer rubber, polyisoprene-SBR block copolymer rubber, polystyrene-polybutadiene-polystyrene block copolymers, emulsion-polymerized styrene-acrylonitrile-butadiene copolymer rubber, and acrylonitrile-butadiene copolymer rubber; olefin rubbers such as ethylene-propylene-diene rubber (EPDM) and ethylene-propylene rubber; non-olefin rubbers such as acrylic rubber, epichlorohydrin rubber, fluororubber, silicone rubber, chloroprene rubber, and urethane rubber; and the like. Among these, olefin rubbers are preferable, conjugated diene rubbers are more preferable, and natural rubber, polyisoprene rubber, and polybutadiene rubber are particularly preferable because they have high compatibility with the liquid cyclopentene ring-opened polymer according to the present invention and increases the effects of the addition of the liquid cyclopentene ring-opened polymer, that is, the cold resistance- and ozone resistance-improving effects.

In order to obtain a cross-linked rubber having excellent mechanical strength, the solid rubber has a weight average molecular weight (Mw) of preferably 100,000 or more, more preferably 200,000 or more, further more preferably 300,000 or more, which is measured by gel permeation chromatography, and is calibrated with polystyrene standards. The upper limit of the weight average molecular weight (Mw) is preferably 2,000,000 or less, although not particularly limited thereto.

The content of the liquid cyclopentene ring-opened polymer according to the present invention in the rubber composition according to the present invention is 1 to 100 parts by weight, preferably 2 to 80 parts by weight, more preferably 5 to 60 parts by weight with respect to 100 parts by weight of the solid rubber. Too small a content of the liquid cyclopentene ring-opened polymer may not provide the effects of the addition of the liquid cyclopentene ring-opened polymer according to the present invention, that is, the cold resistance- and ozone resistance-improving effects. On the other hand, an excess amount of the liquid cyclopentene ring-opened polymer may result in a cross-linked rubber having reduced tensile strength.

The rubber composition according to the present invention preferably contains an inorganic filler in addition to the solid rubber and the liquid cyclopentene ring-opened polymer. The presence of the inorganic filler results in a cross-linked rubber having further enhanced mechanical properties. Examples of the inorganic fillers include powders such as metal powders including aluminum powder, inorganic powders including carbon black, hard clay, talc, calcium carbonate, titanium oxide, calcium sulfate, calcium carbonate, and aluminum hydroxide, and organic powders including starch and polystyrene powder; short fibers such as glass fibers (milled fibers), carbon fibers, aramid fibers, and potassium titanate whiskers; silica and mica; and the like. Among these, carbon black and silica are preferably used, and carbon black is particularly preferably used.

Examples of the carbon black include furnace black, acetylene black, thermal black, channel black, graphite, and the like. Among these, furnace black is preferably used, and specific examples thereof include SAF, ISAF, ISAF-HS, ISAF-LS, IISAF-HS, HAF, HAF-HS, HAF-LS, MAF, EEF, and the like. One of these may be used alone, or two or more of them may be used in combination.

The amount of the inorganic filler added in the rubber composition according to the present invention is preferably 20 to 200 parts by weight, more preferably 25 to 150 parts by weight, further more preferably 30 to 100 parts by weight with respect to 100 parts by weight of the solid rubber. The addition of the inorganic filler in an amount within the above ranges results in a cross-linked rubber having appropriately improved mechanical strength.

The rubber composition according to the present invention preferably further contains a cross-linker. As the cross-linker, an appropriate one capable of cross-linking the solid rubber can be selected according to the type of the solid rubber. Examples thereof include sulfur, sulfur halides, organic peroxides, quinone dioximes, organic polyvalent amine compounds, zinc acrylates, alkylphenol resins having a methylol group, and the like. Among these, sulfur is preferably used. The amount of the cross-linker added in the rubber composition according to the present invention is preferably 0.5 to 5 parts by weight, more preferably 0.7 to 4 parts by weight, further more preferably 1 to 3 parts by weight with respect to 100 parts by weight of the solid rubber.

To the rubber composition according to the present invention may be added necessary amounts of compounding agents such as a cross-linking accelerator, a cross-linking activator, an antioxidant, an activator, a process oil, a plasticizer, and a wax in a conventional manner.

Examples of the cross-linking accelerators include sulfenamide-based cross-linking accelerators such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide, and N,N'-diisopropyl-2-benzothiazolylsulfenamide; guanidine-based cross-linking accelerators such as 1,3-diphenylguanidine, 1,3-di-ortho-tolylguanidine, and 1-ortho-tolylbiguanidine; thiourea-based cross-linking accelerators; thiazole-based cross-linking accelerators; thiuram-based cross-linking accelerators; dithiocarbamic acid-based cross-linking accelerators; xanthogenic acid-based cross-linking accelerators; and the like. Among these, those containing sulfenamide-based cross-linking accelerators are particularly preferable. One of these cross-linking accelerators may be used alone, or two or more of them may be used in combination. The amount of the cross-linking accelerator to be added is preferably 0.1 to 15 parts by weight, more preferably 0.5 to 5 parts by weight with respect to 100 parts by weight of the solid rubber.

Examples of the cross-linking activators include higher fatty acids such as stearic acid, zinc oxide, and the like. The amount of the cross-linking activator to be added is not particularly limited. When a higher fatty acid is used as the cross-linking activator, the amount thereof to be added is preferably 0.05 to 15 parts by weight, more preferably 0.5 to 5 parts by weight with respect to 100 parts by weight of the solid rubber. When zinc oxide is used as the cross-linking activator, the amount thereof to be added is preferably 0.05 to 15 parts by weight, more preferably 0.5 to 5 parts by weight with respect to 100 parts by weight of the solid rubber.

As the process oil, a mineral oil or a synthetic oil may be used. As the mineral oil, an aroma oil, a naphthenic oil, a paraffin oil, or the like is typically used.

The rubber composition according to the present invention can be prepared by any method without limitation, and the ingredients thereof can be kneaded in a conventional manner. In one example, compounding agents (e.g., the inorganic filler) other than the cross-linker and ingredients unstable to heat, the solid rubber, and the liquid cyclopentene ring-opened polymer are kneaded, and then the cross-linker and the ingredients unstable to heat are combined with the kneaded product, thereby providing the desired composition. The temperature during kneading of the compounding agents (e.g., the inorganic filler) other than the cross-linker and the ingredients unstable to heat, the solid rubber, and the liquid cyclopentene ring-opened polymer is preferably 70 to 200° C., more preferably 100 to 180° C. The kneading time is preferably 30 seconds to 30 minutes. The kneaded product is combined with the cross-linker and the ingredients unstable to heat after cooling to a temperature of typically 100° C. or lower, preferably 80° C. or lower.

<Cross-Liked Rubber>

The cross-linked rubber according to the present invention can be obtained by cross-linking the rubber composition according to the present invention.

Any cross-linking method can be used without limitation, and a method may be selected depending on the shape, the size, and the like of the cross-linked rubber. The cross-linking and molding may be performed simultaneously by filling a mold with the rubber composition and then heating the mold, or the rubber composition may be preliminarily molded and then be cross-linked by heating. The cross-linking temperature is preferably 120 to 200° C., more preferably 140 to 180° C. The cross-linking time is typically about 1 to about 120 minutes.

Depending on the shape, the size, and the like thereof, the inside of the cross-linked rubber may not be sufficiently cross-linked even when the surface thereof is cross-linked. For this reason, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus prepared has excellent cold resistance and ozone resistance because it is prepared using the rubber composition prepared by mixing the liquid cyclopentene ring-opened polymer according to the present invention with the solid rubber. Owing to these properties, the cross-linked rubber according to the present invention can be suitably used in various applications including various sealing materials (e.g., rubber vibration isolators, radiator gaskets, brake fluid seals, and seals for aqueous liquids) and various rubber members (e.g., accumulator bladders) for use in vehicles such as trains and automobiles; various rubber members for use in various industrial machines (e.g., rubber vibration isolators, conveyor belts, electrically-insulating covering materials for electric wires and cables, and air suspensions); support rubber materials for use in bridges and buildings; sealing materials for use in various fields such as the air and space field and the ship field (e.g., sealing materials, packings, rubber plugs, and O-rings); fenders for use in the ship field; strength-imparting agents for tackifiers and adhesives; and the like.

EXAMPLES

The present invention is hereinafter illustrated in greater detail with reference to Examples. However, the present invention should not be construed as limited to these examples. In the following examples, all "part(s)" are on a weight basis unless otherwise indicated. Tests and evaluations were performed according to the following methods.

[Weight Average Molecular Weight (Mw) and Number Average Molecular Weight (Mn) of Liquid Cyclopentene Ring-Opened Polymer]

The weight average molecular weight (Mw) and the number average molecular weight (Mn) of the liquid cyclopentene ring-opened polymer were measured with a gel permeation chromatography (GPC) system HLC-8220 (available from TOSOH CORPORATION) including two H-type columns HZ-M (available from TOSOH CORPORATION) connected in series using tetrahydrofuran as a solvent at a column temperature of 40° C. The detector used was a differential refractometer RI-8320 (available from TOSOH CORPORATION). The measured weight average molecular weight (Mw) and number average molecular weight (Mn) of the liquid cyclopentene ring-opened polymer were values calibrated with polystyrene standards.

[Cis/Trans Ratio of Liquid Cyclopentene Ring-Opened Polymer]

The cis/trans ratio of the liquid cyclopentene ring-opened polymer was determined by $^{13}$C-NMR spectrometry.

[Compositional Ratio of Monomer Unit of Liquid Cyclopentene Ring-Opened Polymer]

The compositional ratio of monomer units of the liquid cyclopentene ring-opened polymer was determined by $^1$H-NMR spectrometry.

[Glass Transition Temperature (Tg) and Melting Point (Tm) of Liquid Cyclopentene Ring-Opened Polymer]

The liquid cyclopentene ring-opened polymer was measured with a differential scanning calorimeter (DSC, product name "X-DSC 7000", available from Hitachi High-Tech Science Corporation) at a temperature increase rate of 10° C./min from −150° C. to 40° C. Based on the results, the glass transition temperature (Tg) and the melting point (Tm) were determined.

[Melt Viscosity of Liquid Cyclopentene Ring-Opened Polymer]

The melt viscosity at 25° C. was measured using a Brookfield viscometer DV-II+Pro (available from AMETEK Brookfield). During the measurement, the shear rate was adjusted within the range of 1.2 to 10 sec$^{-1}$ according to the viscosity.

[Low Temperature Retraction Test of Cross-Linked Rubber]

A 50 mm×2 mm piece as an I-shaped test piece was punched out from a 2-mm thick sheet-shaped cross-linked rubber. The test piece obtained was subjected to a low temperature retraction test at an elongation of 50% according to JIS K 6261 using a low temperature retraction tester (product name "TR tester No. 145L", available from YASUDA SEIKI SEISAKUSHO, LTD.). Specifically, the test piece stretched to an elongation of 50% was frozen, and the temperature thereof was continuously raised from −70° C. to measure the retraction ability of the stretched test piece. The temperature TR10 at which the test piece shrank (retracted) 10% in length by the temperature rise was measured. A lower TR 10 corresponds to better cold resistance.

[Static Ozone Aging Test]

A dumbbell-shaped test piece in the shape of dumbbell No. 1 was punched out from a 2-mm thick sheet-shaped cross-linked rubber. The dumbbell-shaped test piece was subjected to a static ozone aging test according to JIS K 6259 using an ozone weather meter (product name "OMS•HN", available from Suga Test Instruments Co., Ltd.) under the following conditions: test temperature of 40° C., ozone concentration of 50 pphm, tensile strain of 20%, and test time of 24 hours. After the ozone aging test, the test piece was evaluated for ozone resistance by observation of the size of cracks according to the crack state observation method of JIS K 6259.

The size of cracks in the test piece was evaluated based on the following criteria.

1: There were no visible cracks but cracks were observed with a 10× magnifying glass.
2: There were visible cracks.
3: There were relatively large and deep cracks (smaller than 1 mm).
4: There were large and deep cracks (1 mm to 3 mm (exclusive))
5: 3 mm or larger cracks were observed or the test piece almost broke off.

[Reference Example 1] Preparation of Toluene Solution of Diisobutyl Aluminum Mono(n-Hexoxide) (2.5% by Weight)

Under a nitrogen atmosphere, 88 parts of toluene and 7.8 parts of a 25.4% by weight solution of triisobutyl aluminum in n-hexane (available from TOSOH FINECHEM CORPORATION) were placed in a glass vessel containing a stir bar. Then, the vessel was cooled to −45° C., and 1.02 parts (equimolar amount to triisobutyl aluminum) of n-hexanol was slowly added dropwise thereto under vigorous stirring. Subsequently, the mixture was left under stirring until it reached room temperature. Thus, a toluene solution of diisobutyl aluminum mono(n-hexoxide) (2.5% by weight) was prepared.

Example 1

[Synthesis of Liquid Cyclopentene Ring-Opened Polymer a and Evaluation of Storage Stability at Low Temperature]

Under a nitrogen atmosphere, 87 parts of a 1.0% by weight solution of $WCl_6$ in toluene and 43 parts of the 2.5% by weight solution of diisobutyl aluminum mono(n-hexoxide) in toluene prepared in Reference Example 1 were placed in a glass vessel containing a stir bar, and the mixture was stirred for 15 minutes to prepare a catalyst solution. Then, under a nitrogen atmosphere, 1000 parts of cyclopentene and 86 parts of 1-hexene were placed in a pressure-resistant glass reaction vessel equipped with a stirrer. Subsequently, 130 parts of the catalyst solution prepared above was added thereto to cause the polymerization reaction to proceed at 25° C. for 4 hours (the concentration of cyclopentene in the reaction solution was 74 wt %). After the 4-hour polymerization reaction, an excess amount of ethyl alcohol was added to the pressure-resistant glass reaction vessel to terminate the polymerization reaction, and then the polymer was precipitated with a large amount of ethanol. The ethanol supernatant was removed by decantation. After washing with ethanol twice, the polymer precipitate was collected, and then 0.2 parts of an antioxidant (product name Irganox 1520L, available from Ciba Specialty Chemicals Inc.) was added with respect to 100 parts of the polymer. Then, the polymer was dried under vacuum at 40° C. for 3 days, thereby yielding 205 parts of a liquid cyclopentene ring-opened polymer A. The liquid cyclopentene ring-opened polymer A thus obtained had an Mn of 3,700, an Mw of 5,700, a cis/trans ratio of 68/32 (which means that the cis double bond content in repeating units was 68% and the trans double bond content in the repeating units was 32%. The same applies to the following examples), and a Tg of −106° C., and Tm was not observed. The melt viscosity measured at 25° C. was 450 mPa·s.

The liquid cyclopentene ring-opened polymer A obtained was stored in a freezer at −30° C. for one week, and was taken out after one week. It was found that the liquid cyclopentene ring-opened polymer A maintained the liquid state. This demonstrates that the liquid cyclopentene ring-opened polymer A had excellent handling properties at low temperature.

Example 2

[Synthesis of Liquid Cyclopentene Ring-Opened Polymer B and Evaluation of Storage Stability at Low Temperature]

243 Parts of a liquid cyclopentene ring-opened polymer B was prepared in the same manner as in Example 1 except that 900 parts of cyclopentene and 100 parts of dicyclopentadiene were used instead of 1000 parts of cyclopentene. The liquid cyclopentene ring-opened polymer B thus obtained had an Mn of 3,800, an Mw of 5,700, a cis/trans ratio of 64/36, a polymer compositional ratio (cyclopentene monomer unit/dicyclopentadiene monomer unit) of 93/7 (mol/mol), and a Tg of −95° C., and Tm was not observed. The melt viscosity measured at 25° C. was 550 mPa·s.

The liquid cyclopentene ring-opened polymer B obtained was stored in a freezer at −30° C. for one week, and was taken out after one week. It was found that the liquid cyclopentene ring-opened polymer B maintained the liquid state. This demonstrates that the liquid cyclopentene ring-opened polymer B had excellent handling properties at low temperature.

Comparative Example 1

[Synthesis of Liquid Cyclopentene Ring-Opened Polymer C and Evaluation of Storage Stability at Low Temperature]

Under a nitrogen atmosphere, 1000 parts of cyclopentene, 21.5 parts of 1-hexene, and 990 parts of toluene were placed in a pressure-resistant glass reaction vessel containing a magnetic stirrer. Subsequently, 0.068 parts of dichloro-(3-phenyl-1H-inden-1-ylidene)bis(tricyclohexylphosphine)ruthenium (II) (ruthenium carbene complex catalyst) dissolved in 10 parts of toluene was added thereto to cause the polymerization reaction to proceed at 25° C. for 3 hours. After the 3-hour polymerization reaction, an excess amount of vinyl ethyl ether was added to terminate the polymerization reaction, and then the polymer was precipitated with a large amount of methanol. The supernatant was removed to collect the precipitate. The residual solvent was removed from the collected precipitate in an evaporator, and 0.2 parts of an antioxidant (product name Irganox 1520L, available from Ciba Specialty Chemicals Inc.) was added with respect to 100 parts of the polymer obtained by polymerization. Then, the polymer was dried under vacuum at 40° C. for 3 days to yield 700 parts of a liquid cyclopentene ring-opened polymer C. The liquid cyclopentene ring-opened polymer C thus obtained had an Mn of 4,600, an Mw of 7,600, a cis/trans ratio of 18/82, a Tg of −92° C., and a Tm of 23° C. The melt viscosity measured at 25° C. was 3,240 mPa·s.

The liquid cyclopentene ring-opened polymer C obtained was stored in a freezer at −30° C. for one week, and was taken out after one week. It was found that the liquid cyclopentene ring-opened polymer C had solidified, and could not be removed from the container. This demonstrates that the liquid cyclopentene ring-opened polymer C had remarkably poor handling properties at low temperature.

Comparative Example 2

[Synthesis of Liquid Cyclooctene Ring-Opened Polymer D and Evaluation of Storage Stability at Low Temperature]

350 Parts of a liquid cyclooctene ring-opened polymer D was prepared in the same manner as in Example 1 except that 1000 parts of cyclooctene was used instead of 1000 parts of cyclopentene. The liquid cyclooctene ring-opened polymer D thus obtained had an Mn of 2,700, an Mw of 4,800, a cis/trans ratio of 70/30, a Tg of −92° C., and a Tm of −2° C. The melt viscosity measured at 25° C. was 4,100 mPa·s.

The liquid cyclooctene ring-opened polymer D obtained was stored in a freezer at −30° C. for one week, and was taken out after one week. It was found that the liquid cyclooctene ring-opened polymer D had solidified, and could not be removed from the container. This demonstrates that the liquid cyclooctene ring-opened polymer D had remarkably poor handling properties at low temperature.

Comparative Example 3

[Synthesis of Solid Cyclopentene Ring-Opened Polymer E]

Under a nitrogen atmosphere, 87 parts of a 1.0% by weight solution of $WCl_6$ in toluene and 43 parts of the 2.5% by weight solution of diisobutyl aluminum mono(n-hexoxide) in toluene prepared in Reference Example 1 were placed in a glass vessel containing a stir bar, and the mixture was stirred for 15 minutes to prepare a catalyst solution. Subsequently, under a nitrogen atmosphere, 300 parts of cyclopentene and 0.26 parts of 1-hexene were placed in a pressure-resistant glass reaction vessel equipped with a stirrer. Then, 130 parts of the catalyst solution prepared above was added thereto to cause the polymerization reaction to proceed at 0° C. for 4 hours. After the 4-hour polymerization reaction, an excess amount of ethyl alcohol was added to the pressure-resistant glass reaction vessel to terminate the polymerization reaction, and then 0.2 parts of an antioxidant (product name Irganox 1520L, available from Ciba Specialty Chemicals Inc.) was added with respect to 100 parts of the polymer obtained by polymerization. Subsequently, the polymer was solidified using a large amount of ethanol, and was collected and dried under vacuum at 40° C. for 3 days, thereby yielding 74 parts of a solid cyclopentene ring-opened polymer E. The solid cyclopentene ring-opened polymer E thus obtained had an Mw of 389,000, a cis/trans ratio of 81/19, and a Tg of −108° C.

Comparative Example 4

[Synthesis of Liquid Cyclopentene Ring-Opened Polymer F and Evaluation of Storage Stability at Low Temperature]

225 Parts of a liquid cyclopentene ring-opened polymer F was prepared in the same manner as in Example 1 except that 1000 parts of cyclopentene and 86 parts of 1-hexene were combined, and then 870 parts of toluene was further added thereto to prepare a reaction solution containing cyclopentene at a concentration of 48% by weight, and the polymerization temperature was 0° C. The liquid cyclopentene ring-opened polymer F thus obtained had an Mn of 3,200, an Mw of 5,500, a cis/trans ratio of 45/55, a Tg of −97° C., and a Tm of 5° C. The melt viscosity measured at 25° C. was 1,780 mPa·s.

The liquid cyclopentene ring-opened polymer F obtained was stored in a freezer at −30° C. for one week, and was taken out after one week. It was found that the liquid cyclopentene ring-opened polymer F had solidified, and could not be removed from the container. This demonstrates that the liquid cyclopentene ring-opened polymer F had remarkably poor handling properties at low temperature.

Example 3

[Preparation of Rubber Composition and Cross-Linked Rubber Using Liquid Cyclopentene Ring-Opened Polymer A]

In a Banbury-type mixer, 100 parts of polybutadiene rubber (product name "Nipol BR1220", available from Zeon Corporation, weight average molecular weight (Mw): 468,000, Mooney viscosity ($ML_{1+4}$, 100° C.): 44, solid at normal temperature) was masticated for 30 seconds, and then 50 parts of the liquid cyclopentene ring-opened polymer A prepared in Example 1, 2 parts of stearic acid, 3 parts of zinc oxide, 60 parts of carbon black (product name "IRB #8", available from Continental Carbon Company), and 15 parts of a process oil (product name "Aromax T-DAE", available from JK Nippon Oil & Energy Corporation) were added thereto. After the mixture was kneaded at 110° C. for 180 seconds, the compounding agents remaining on the top of the ram were cleaned, the mixture was kneaded for further 150 seconds, and then the kneaded product was discharged from the mixer. The kneaded product was cooled to room temperature, and then the cooled kneaded product, 1.5 parts of sulfur, and 0.9 parts of N-(tert-butyl)-2-benzothiazolylsulfenamide (product name "Nocceler NS-P", available from OUCHI SHINKO CHEMICAL INDUSTRIAL CO., LTD.) as a crosslinking accelerator were kneaded in an open roll at 23° C., thereby yielding a rubber composition in the form of a sheet. The rubber composition obtained was press-crosslinked for 20 minutes at 160° C., thereby providing a sheet-shaped cross-linked rubber having a thickness of 2 mm. The sheet-shaped cross-linked rubber thus obtained was subjected to the low temperature retraction test and the static ozone aging test according to the methods described above. The results are shown in Table 1.

Example 4

[Preparation of Rubber Composition and Cross-Linked Rubber Using Liquid Cyclopentene Ring-Opened Polymer B]

A rubber composition and a cross-linked rubber were prepared in the same manner as in Example 3 except that 50 parts of the liquid cyclopentene ring-opened polymer B prepared in Example 2 was used instead of 50 parts of the liquid cyclopentene ring-opened polymer A prepared in Example 1, and were evaluated in the same manner as in Example 3. The results are shown in Table 1.

Comparative Example 5

[Preparation of Rubber Composition and Cross-Linked Rubber Using Liquid Cyclopentene Ring-Opened Polymer C]

A rubber composition and a cross-linked rubber were prepared in the same manner as in Example 3 except that 50 parts of the liquid cyclopentene ring-opened polymer C prepared in Comparative Example 1 was used instead of 50 parts of the liquid cyclopentene ring-opened polymer A prepared in Example 1, and were evaluated in the same manner as in Example 3. The results are shown in Table 1.

Comparative Example 6

[Preparation of Rubber Composition and Cross-Linked Rubber Using Liquid Cyclooctene Ring-Opened Polymer D]

A rubber composition and a cross-linked rubber were prepared in the same manner as in Example 3 except that 50 parts of the liquid cyclooctene ring-opened polymer D prepared in Comparative Example 2 was used instead of 50 parts of the liquid cyclopentene ring-opened polymer A prepared in Example 1, and were evaluated in the same manner as in Example 3. The results are shown in Table 1.

Comparative Example 7

[Preparation of Rubber Composition and Cross-Linked Rubber Using Solid Cyclopentene Ring-Opened Polymer E]

In a Banbury-type mixer, 50 parts of the solid cyclopentene ring-opened polymer E prepared in Comparative Example 3 and 100 parts of polybutadiene rubber (product name "Nipol BR1220", available from Zeon Corporation, weight average molecular weight (Mw): 468,000, Mooney viscosity ($ML_{1+4}$, 100° C.): 44, solid at normal temperature) were masticated for 30 seconds, and then 2 parts of stearic acid, 3 parts of zinc oxide, 60 parts of carbon black (product name "IRB #8", available from Continental Carbon Company), and 15 parts of a process oil (product name "Aromax T-DAE", available from JK Nippon Oil & Energy Corporation) were added thereto. After the mixture was kneaded at 110° C. for 180 seconds, the compounding agents remaining on the top of the ram were cleaned, the mixture was kneaded for further 150 seconds, and then the kneaded product was discharged from the mixer. Subsequently, the kneaded product was cooled to room temperature, and then the cooled kneaded product, 1.5 parts of sulfur, and 0.9 parts of N-(tert-butyl)-2-benzothiazolylsulfenamide (product name "Nocceler NS-P", available from OUCHI SHINKO CHEMICAL INDUSTRIAL CO., LTD.) as a crosslinking accelerator were kneaded in an open roll at 23° C., thereby providing a sheet-shaped rubber composition. The rubber composition obtained was press-crosslinked for 20 minutes at 160° C., thereby providing a sheet-shaped cross-linked rubber having a thickness of 2 mm. The sheet-shaped cross-linked rubber obtained was subjected to the low temperature retraction test and the static ozone aging test according to the methods described above. The results are shown in Table 1.

Comparative Example 8

[Preparation of Rubber Composition and Cross-Linked Rubber Using Liquid Cyclopentene Ring-Opened Polymer F]

A rubber composition and a cross-linked rubber were prepared in the same manner as in Example 3 except that 50 parts of the liquid cyclopentene ring-opened polymer F prepared in Comparative Example 4 was used instead of 50 parts of the liquid cyclopentene ring-opened polymer A prepared in Example 1, and were evaluated in the same manner as in Example 3. The results are shown in Table 1.

TABLE 1

|  |  | Example | | Comparative Example | | | |
|---|---|---|---|---|---|---|---|
|  |  | 3 | 4 | 5 | 6 | 7 | 8 |
| Composition | | | | | | | |
| Solid polybutadiene rubber | (Parts) | 100 | 100 | 100 | 100 | 100 | 100 |
| Liquid cyclopentene ring-opened polymer A (Example 1, Mw = 5,700, Cis content: 68%) | (Parts) | 50 | — | — | — | — | — |
| Liquid cyclopentene ring-opened polymer B (Example 2, Mw = 5,700, Cis content: 64%) | (Parts) | — | 50 | — | — | — | — |
| Liquid cyclopentene ring-opened polymer C (Comparative Example 1, Mw = 7,600, Cis content: 18%) | (Parts) | — | — | 50 | — | — | — |
| Liquid cyclooctene ring-opened polymer D (Comparative Example 2, Mw = 4,800, Cis content: 70%) | (Parts) | — | — | — | 50 | — | — |
| Solid cyclopentene ring-opened polymer E (Comparative Example 3, Mw = 389,000, Cis content: 81%) | (Parts) | — | — | — | — | 50 | — |
| Liquid cyclopentene ring-opened polymer F (Comparative Example 4, Mw = 5,500, Cis content: 45%) | (Parts) | — | — | — | — | — | 50 |
| Stearic acid | (Parts) | 2 | 2 | 2 | 2 | 2 | 2 |
| Zinc oxide | (Parts) | 3 | 3 | 3 | 3 | 3 | 3 |
| Carbon black | (Parts) | 60 | 60 | 60 | 60 | 60 | 60 |
| Sulfur | (Parts) | 1.5 | 1.5 | 1.5 | 1.5 | 1.5 | 1.5 |
| N-(tert-butyl)-2-benzothiazolylsulfenamide | (Parts) | 0.9 | 0.9 | 0.9 | 0.9 | 0.9 | 0.9 |
| Process oil | (Parts) | 15 | 15 | 15 | 15 | 15 | 15 |
| Evaluation results | | | | | | | |
| Low temperature retraction test TR10 | (° C.) | −48 | −42 | −5 | −12 | −45 | −23 |
| Ozone resistance |  | 1 | 1 | 2 | 2 | 3 | 2 |

As described in Examples 1 and 2, the liquid cyclopentene ring-opened polymers having a weight average molecular weight (Mw) of 1,000 to 50,000 and a cis double bond content of 55% or more in repeating units maintained the liquid state even after storage at −30° C., which indicates their excellent handling properties at low temperature. The cross-linked rubbers prepared by mixing the liquid cyclopentene ring-opened polymers with the solid rubbers and cross-linking the resulting rubber compositions as described in Examples 3 and 4 had a low TR10 determined by the low temperature retraction test, which indicates their excellent cold resistance. The cross-linked rubbers additionally had excellent ozone resistance.

In contrast, as described in Comparative Examples 1 and 4, the liquid cyclopentene ring-opened polymers having a cis double bond content of less than 55% in repeating units solidified during storage at −30° C., which indicates their poor handling properties. The cross-linked rubbers prepared by mixing the liquid cyclopentene ring-opened polymers with the solid rubbers and cross-linking the resulting rubber compositions as described in Comparative Examples 5 and 8 had a high TR10, which indicates their poor cold resistance. The cross-linked rubbers additionally had poor ozone resistance.

As described above in Comparative Example 2, regardless of its cis double bond content in repeating units, the liquid cyclooctene ring-opened polymer solidified during storage at −30° C., which indicates its poor handling properties at low temperature. The cross-linked rubber prepared by mixing the liquid cyclooctene ring-opened polymer with the solid rubber and cross-linking the resulting rubber composition as described in Comparative Example 6 had a high TR10 determined by the low temperature retraction test, which indicates its poor cold resistance. The cross-linked rubber additionally had poor ozone resistance.

In the case where the solid cyclopentene ring-opened polymer having a cis double bond content of 55% or more in repeating units was mixed with the solid rubber as described in Comparative Example 7, the cross-linked rubber prepared by cross-linking the rubber composition had poor ozone resistance in spite of its low TR10 of the low temperature retraction test.

The invention claimed is:

1. A rubber composition comprising
100 parts by weight of a solid rubber,
1 to 100 pars by weight of a liquid cyclopentene ring-opened polymer having a weight average molecular weight (Mw) of 2,000 to 20,000 and a cis double bond content of 55% or more in repeating units, and
a cross-linker.

2. The rubber composition according to claim 1, wherein the liquid cyclopentene ring-opened polymer contains structural units derived from cyclopentene in an amount of 80 mol % or more of the total repeating units.

3. The rubber composition according to claim 1, wherein the liquid cyclopentene ring-opened polymer is a polymer consisting of only structural units derived from cyclopentene.

4. The rubber composition according to claim 1, wherein the liquid cyclopentene ring-opened polymer has a cis double bond content in the repeating units is more than 60%.

5. The rubber composition according to claim 1, wherein the liquid cyclopentene ring-opened polymer has a melt viscosity measured at 25° C. of 3,000 Pa·s or less.

6. The rubber composition according to claim 1, further comprising an inorganic filler.

7. A cross-linked rubber obtained by cross-linking the rubber composition according to claim 1.

8. A method for producing the liquid cyclopentene ring-opened polymer having a weight average molecular weight (Mw) of 2,000 to 20,000 and a cis double bond content of 55% or more in repeating units, comprising:

performing ring-opening polymerization of a monomer including cyclopentene at a polymerization temperature of 20° C. to 80° C. using a chain transfer agent and polymerization catalysts including a transition metal compound (A) of Group 6 in the periodic table and an organoaluminum compound (B) represented by general formula (1):

$$(R^1)_{3-x}Al(OR^2)_x \qquad (1)$$

wherein $R^1$ and $R^2$ each represent a $C_{1-20}$ hydrocarbon group, and X satisfies 0<X<3.

* * * * *